United States Patent [19]

Graham et al.

[11] 4,384,823

[45] May 24, 1983

[54] CURVED FILM COOLING ADMISSION TUBE

[75] Inventors: Robert W. Graham, Fairview Park; S. Stephen Papell, Berea, both of Ohio

[73] Assignee: The United States of America as represented by the Administrator of the National Aeronautics and Space Administration, Washington, D.C.

[21] Appl. No.: 200,634

[22] Filed: Oct. 27, 1980

[51] Int. Cl.[3] .......... B64C 27/00; F01D 5/08

[52] U.S. Cl. .......... 416/1; 415/115; 416/97 R

[58] Field of Search .......... 60/755, 756, 757, 265; 416/96 A, 96 R, 97 A, 97 R; 415/115, 116, DIG. 1; 244/117 A, 163; 114/67 A

[56] References Cited

U.S. PATENT DOCUMENTS

| | | | |
|---|---|---|---|
| 3,388,888 | 6/1968 | Kercher et al. | 415/115 |
| 3,589,128 | 6/1971 | Sweet | 60/757 |
| 3,605,412 | 9/1971 | Stockel | 60/265 |
| 3,978,662 | 9/1976 | Dubell et al. | 60/757 |
| 4,021,139 | 5/1977 | Franklin | 415/115 |
| 4,056,332 | 11/1977 | Meloni | 416/96 A |
| 4,270,883 | 6/1981 | Corrigan | 415/115 |
| 4,314,442 | 2/1982 | Rice | 415/115 |

FOREIGN PATENT DOCUMENTS

| | | | |
|---|---|---|---|
| 1151368 | 1/1958 | France | 415/115 |
| 565991 | 4/1977 | U.S.S.R. | 415/115 |

*Primary Examiner*—Carlton R. Croyle
*Assistant Examiner*—Jeffrey A. Simenauer
*Attorney, Agent, or Firm*—Norman T. Musial; John R. Manning; James A. Mackin

[57] ABSTRACT

The object of the invention is to provide more effective film cooling to protect a wall surface from a hot fluid which impinges on or flows along the surface. A film of cooling fluid having increased area is provided by changing the direction of a stream of cooling fluid through an angle of from 135° to 165° before injecting it through the wall into the hot flowing gas.

As shown in FIG. 1, cooling fluid is injected from an orifice (16) through a wall (10) into a hot flowing gas (11) at an angle (20) to form a cooling fluid film (12). Cooling fluid is supplied to the orifice (16) from a cooling fluid source (13) via a turbulence control passageway (14) having a curved portion (18) between two straight portions (17 and 19).

The angle (24) through which the direction of the cooling fluid is turned results in less mixing of the cooling fluid with the hot gas (11), thereby substantially increasing the length of the film (12) in a downstream direction.

FIGS. 2, 3, 4 and 5 illustrate specific applications of the invention.

11 Claims, 5 Drawing Figures

CURVED FILM COOLING ADMISSION TUBE

DESCRIPTION

ORIGIN OF THE INVENTION

This invention was made by employees of the U.S. Government and may be manufactured or used by or for the Government of the United States without the payment of any royalties thereon or therefor.

TECHNICAL FIELD

The invention relates to methods and apparatus for cooling structures which operate at high temperatures and is directed more particularly to a method and apparatus for establishing a layer of low temperature fluid between a hot flowing fluid and a wall which contains the hot fluid (film cooling).

DESCRIPTION OF THE PRIOR ART

Film cooling of the surfaces of turbine combustor walls and turbine stator blades is generally well-know. In such apparatus, a coolant such as air is injected through a straight tube which is inclined at an angle to a surface to be protected. The coolant displaces a hot fluid flowing along the surface, thereby forming a layer of coolant between the surface and the hot fluid.

The coolant layer extends in a downstream direction for a distance determined by the amount of mixing or blending of the coolant in the hot fluid. After the coolant and the hot fluid are thoroughly mixed, of course, the cooling effect is lost. Accordingly, to obtain maximum cooling, the mixing of the coolant and the hot fluid must be minimized to extend the coolant layer in a downstream direction as far as possible. Exemplary patents which disclose the flow of fluids in separate layers are as follows:

The Verschuur patent, U.S. Pat. No. 3,865,136, discloses a housing which causes an annular layer of water to be injected into the end of an oil pipeline so that oil flowing in the pipeline is always surrounded by a layer of water to reduce friction. U.S. Pat. No. 3,593,968 to Geddes discloses that a hot gas may be flowed downwardly through a cylindrical structure, the inner surface of which is covered with a quench oil.

U.S. Pat. No. 3,959,420 to Geddes et al discloses a quench tube for a high temperature furnace effluent. In operation, quench oil is introduced continuously into the housing chamber over the lip of an inverted ring to flow continuously down the sides of the quenched tube inner wall.

Other patents of interest are as follows:

U.S. Pat. No. 3,290,883 to Giles et al discloses that visco-elastic materials may be injected from orifices in structures such as turbine blades used in hydraulic equipment to reduce frictional drag.

U.S. Pat. No. 3,199,466 discloses that melted chocolate may be directed upwardly through a large pipe and then horizontally through a much smaller pipe causing large air bubbles to be broken up into bubbles of such small size that they can no longer be detected and no longer have a disturbing effect on the surface of the prepared chocolate products. The horizontal tube then curves to deliver the chocolate in a generally downward direction.

SUMMARY OF THE INVENTION

It is an object of the invention to provide method and apparatus for increasing the effectiveness of film cooling.

It is another object of the invention to provide film cooling apparatus wherein the direction of flow of a coolant fluid is changed prior to its injection into a flowing hot gas whereby mixing of the coolant fluid and the hot fluid is minimized.

In summary, a cooling fluid is injected through an orifice in a wall into a flowing hot gas in contact with the wall. The cooling fluid is injected in a direction with the flow of the hot fluid but at an angle of less than about 45° to the wall surface. Before being injected into the hot flowing fluid, a direction of flow of the cooling fluid is changed through an angle substantially greater than 90°. The angle of injection and the change of direction of the cooling fluid produced a film cooling layer substantially extended in a downstream direction.

DESCRIPTION OF THE PREFERRED EMBODIMENT

Figure 1:
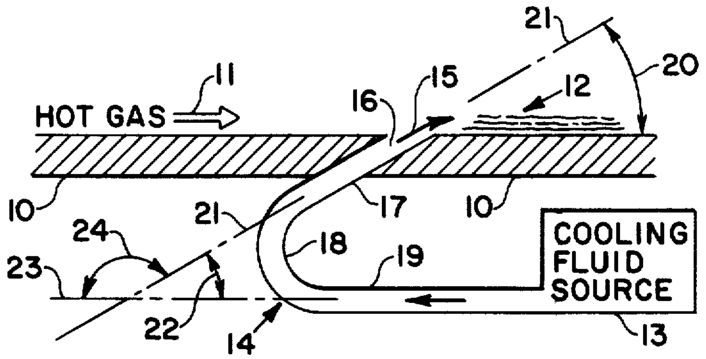
FIG. 1 is a schematic drawing of a preferred embodiment of the invention.

Referring now to FIG. 1, there is shown a wall 10, one surface of which is contacted by a hot gas flowing in a direction as indicated by arrow 11. In order to protect the wall 10 from the flowing hot gas it is desirable to provide a film or layer of a coolant as indicated by the arrow 12, which layer separates the hot flowing gas from the surface of the wall 10. To this end, a coolant or cooling fluid is directed from a pressurized cooling fluid source 13 via a turbulence control passageway 14 and is injected into the hot flowing gas, as indicated by arrow 15 through an orifice 16. Turbulence control passageway 14 changes the direction of flow of the cooling fluid through an angle of from about 135° to 165° before it is injected into the hot flowing gas. This has been found to increase the length of the cooling film 12 in a downstream direction, thereby providing more effective cooling of the wall 10.

In order to provide a degree of turbulence to the coolant fluid such that it will flow as a layer for a maximum distance in a downstream direction, the turbulence control passageway 14 includes a first straight portion 17, a curved portion 18 and a second straight portion 19. The curved portion 18 of the turbulent control passageway 14 smoothly joins the straight portion 17 and 19.

Generally, in accordance with the invention, the direction of flow of a cooling fluid is changed in direction through an angle of from about 135° to 165° before being injected through a wall into a hot gas contacting the wall. However, numerous other parameters affect mixing of the cooling fluid with the hot flowing gas.

Some of these parameters include the diameter of the turbulence control passageway 14, the density and flow rate of the hot gas, the density and flow rate of the cooling fluid, and the angle of injection of the cooling fluid into the hot gas. All these parameters must be adjusted to obtain the maximum film cooling effect of the coolant layer 12. Two important parameters are the angle of injection of the cooling fluid and the angle of the change of direction of the cooling fluid flow. The angle of cooling fluid injection is the angle between the one surface of wall 10 and the broken line 21 which lies on the axis of the straight portion 17 of the turbulence control passageway 14, as indicated by the double-ended arrow 20. The angle between the first straight portion 17 and the second straight portion 19 of the turbulence control passageway 14 is represented by the double-ended arrow 22 between broken line 21 which lies on the axis of straight portion 17 and the broken line 23 which lies on the axis of the second portion 19 of the passageway 14. The angle through which the flowing cooling fluid is turned is indicated by the double-ended arrow 24.

According to the invention, the angle 20 is preferably from about 15° to 45° while the angle 24 is preferably from about 135° to 165°. These angles, of course, must be selected in accordance with the numerous other parameters previously mentioned.

Figure 2:
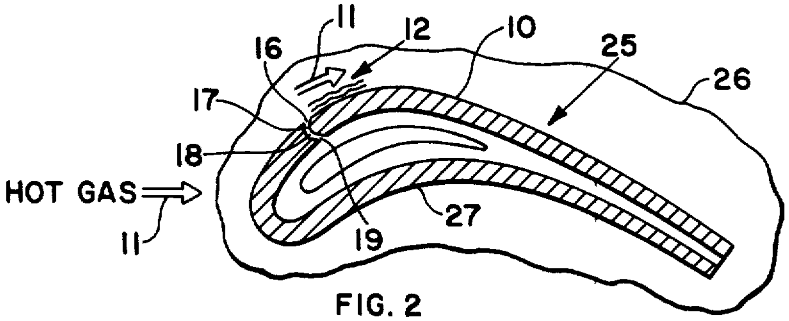
FIG. 2 is a transverse sectional view of a turbine blade having a coolant injection passageway in accordance with the invention.

Referring now to FIG. 2, there is shown a transverse cross-sectional view of a turbine blade 25 extending radially from a hub 26. Relatively cool air is supplied to the inside of turbine blade 25 through an aperture 27 in the hub 26. The cooling air exits from the turbine blade 25 through a passageway comprised of portions 16, 17, 18 and 19 which correspond to the like numerals in FIG. 1, which passageway is completely formed in the wall 10 which forms the turbine blade 25. A film or layer of relatively cool air 12 is thereby formed between the flowing hot gas 11 and the exterior surface of the turbine blade 25.

Figure 3:
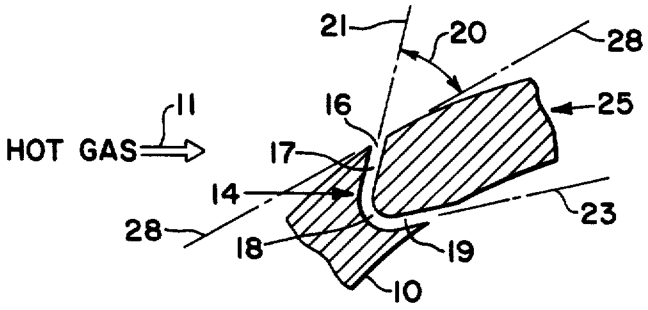
FIG. 3 is an enlarged view of the coolant injection passage of FIG. 2.

FIG. 3 is an enlarged view of the turbulence control passageway 14 shown in FIG. 2 and items corresponding to those in FIGS. 1 and 2 are identified by identical numerals. Because the surface of the turbine blade 25 which is contacted by the hot gas 11 is curved, the angle 20 of coolant injection is measured between the line 21 and a line 28 which is tangent to the surface of turbine blade 25 at the orifice 16. Also, the line 23 which lies on the axis of the straight portion 19 of the turbulence control passageway 14 does not parallel the line 28 as it does with the flat surface of the wall 10 in FIG. 1. This is an allowable variation in that the angle of injection of the coolant and the change of angle of flow are the more important parameters of the invention.

Figure 4:
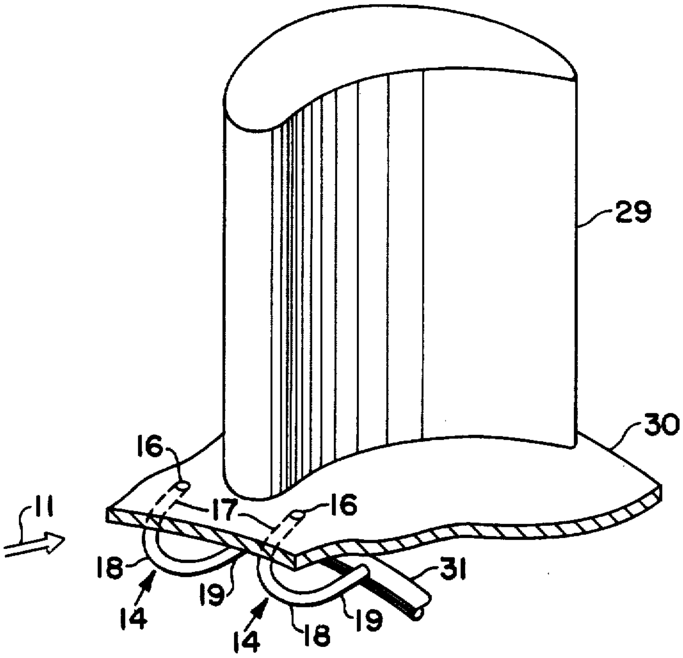
FIG. 4 is a pictorial drawing of a turbine stator blade mounted on a surface which is cooled in accordance with the invention.

FIG. 4 shows a stator blade 29 mounted on an end wall 30. A cooling film to protect end wall 30 from flowing hot gas 11 is established by cool air injected from orifices 16 via turbulence control passageways 14. Air for the passageways 14 is provided from a manifold 31 connected to a pressurized source of cooling fluid not shown. The portions 16, 17, 18 and 19 of passageways 14 correspond to light portions shown in FIG. 1.

Figure 5:
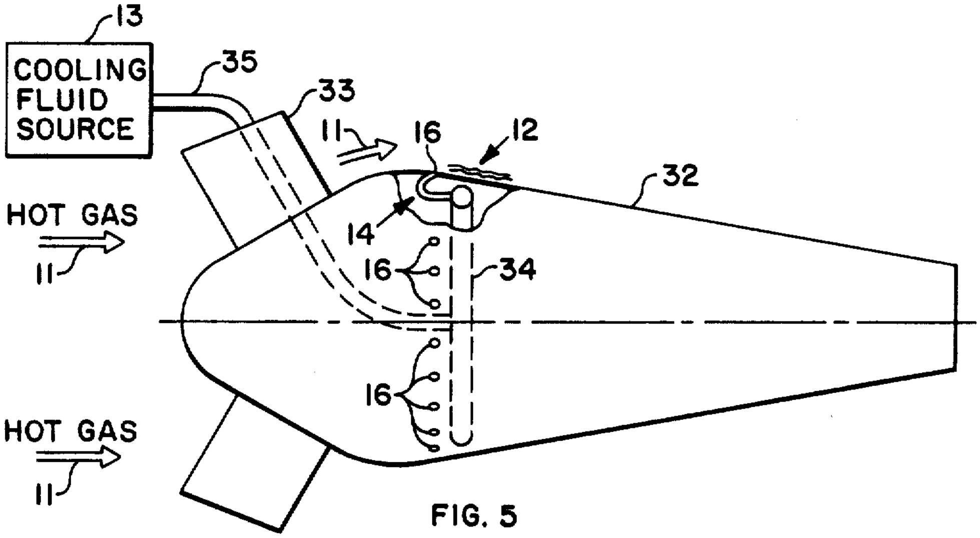
FIG. 5 is a schematic drawing of an exhaust nozzle plug for a turbojet engine and cooled in accordance with the invention.

FIG. 5 illustrates schematically and in partial cutaway, the application of the invention to an exhaust plug nozzle for a turbojet engine and components corresponding to those in FIG. 1 are identified by like numerals. There is shown in FIG. 5 an exhaust nozzle plug 32 supported by hollow struts 33. A plurality of orifices 16 are disposed in a row around exhaust nozzle plug 32 and each orifice 16 is connected by means of a turbulence control passageway 14 to a ring manifold 34. The turbulence control passageways 14 each embody the straight and curved portions previously described with regard to FIG. 1. A cooling fluid is supplied to ring manifold 34 via a conduit 35 and is injected to the hot gas 11 flowing over the exterior surface of plug 32 through orifices 16.

Where a discussion of the parameters of the invention and the allowable variations in those parameters is made, reference will now be made to FIG. 1. The injection angle 20 may be from about 15° to about 45° with 30° being preferred. Angle 22 which is the angle between the straight portions 17 and 19 of the passageway 14 may also be from about 15° to about 45° with 30° being preferred. It should be noted that angles 20 and 22 do not have to be equal as this occurs only when the straight portion 19 of passageway 14 is parallel to the wall 10. As indicated previously, the change of direction of flow of the cooling fluid is the angle 24 which is obtained by subtracting te angle 22 from 180°. Accordingly, since angle 22 may be between 15° and 45°, angle 24 may be from about 135° to 165°. With regard to the turbulence control passageway 14, its size is limited only by practical considerations. For example, if the passageway 14 and the orifice 16 were to be embodied in a turbine blade, as in FIG. 2, their diameters might be on the order of 1 or 2 millimeters. On the other hand, if the invention of FIG. 1 were to be used with a turbine engine combustor, a diameter of passageway 14 might be on the order of 2 centimeters.

The curved portion 18 of passageway 14 has a radius of curvature wherein the inside curve, which is the one touched by the connecting line from numeral 18, is from about 1.5 to 2.5 times the diameter of the passageway. The diameter of the orifice 16 is equal to the diameter of the passageway 14 and this diameter is constant throughout the length of the passageway 14.

Another important consideration of the present invention, as with any film cooling device, is the blowing rate which is a relationship between a flow of hot fluid and a flow of cooling fluid injected into the hot fluid. By definition, the blowing rate is the mass flow per unit area of coolant divided by the free stream flow. The defining equation is $(\rho V)_c/(\rho V)_\infty$ where C is the coolant; $\infty$ is the hot fluid stream; $\rho$ is the density; and V is the velocity.

Regardless of the diameter of the turbulence control passageway 14, it has been found that the blowing rate used with the present invention is preferably between 0.37 and 0.7 with 0.46 being preferred when the angle of injection of the cooling fluid is about 30°. In one specific embodiment of the invention, the angles 20 and 22 are 30°; the inside diameter of passageway 14 and orifice 16 is 1.15 centimeters; the radius of the inside curve of curved portion 18 is 2.5 centimeters; and the cooling fluid is air.

It will be understood that changes and modifications may be made to the above-identified invention by those skilled in the art without departing from the spirit and scope of the invention as set forth in the claims appended hereto.

We claim:

1. An improved method of providing film cooling for a wall contacted on one side by a hot flowing gas comprising the steps of:

providing a stream of cooling gas on the other side of said wall and directed in a direction generally opposite to that of the hot flowing gas;

changing the direction of flow of said cooling gas through a sharp curve by an angle of from 135° to 165° to produce turbulence in said cooling gas: and, injecting said cooling gas into said hot flowing gas at an angle of from about 15° to 45° to said wall in a downstream direction at a blowing rate of between about 0.37 and 0.7.

2. The method of claim 1 wherein the blowing rate is about 0.46.

3. The method of claim 1 wherein the change of direction of said cooling gas is about 150° and the angle at which said cooling gas is injected into said hot flowing gas is about 30°.

4. The method of claim 3 wherein said blowing rate is about 0.46.

5. In a film cooling apparatus of the type wherein a coolant gas from a pressurized coolant source is injected through a wall at an acute angle into a free flowing hot gas contained by the wall whereby a film of coolant is provided between the hot gas and the wall, the improvement comprising:

a passageway connecting said pressurized coolant source to an orifice in the wall, said passageway having first and second straight portions joined by a curved portion, said first straight portion being at an angle of between 15° and 45° with respect to the portion of the wall downstream of said orifice, and being in axial alignment with the orifice, the inside curve of said curved portion having a radius of curvature about 1.5 to 2.5 times the diameter of the passageway, which diameter is substantially equal to the diameter of the orifice, said first and second straight portions being at an angle of between 15° and 45° to each other, said first and second portions joined by said curved portion comprising turbulence control means, the pressure of said pressurized coolant source being such as to produce a blowing rate of from about 0.37 to 0.7.

6. The apparatus of claim 5 wherein said second straight portion of said passageway is substantially parallel to the wall.

7. The apparatus of claim 5 wherein said blowing rate is about 0.46.

8. The apparatus of claim 5 wherein the angle of the orifice with the wall is about 30° and the angle between the first and second straight portions of the passageway is about 30°.

9. The apparatus of claim 8 wherein the blowing rate is about 0.46.

10. The apparatus of claim 5 wherein the surface of the wall adjacent the hot gas is convex and wherein the angles specified for the orifice and passageway are with respect to an imaginary line tangent to the convex surface at the center of the orifice.

11. The apparatus of claim 5 wherein the orifice, the curved portion of the passageway and the first and second straight poritons of the passageway all lie within the wall.

* * * * *